US008628278B2

(12) United States Patent
Krenzer

(10) Patent No.: US 8,628,278 B2
(45) Date of Patent: Jan. 14, 2014

(54) DRILL

(75) Inventor: Ulrich Krenzer, Zirndorf (DE)

(73) Assignee: Mapal Fabrik fur Prazisionswerkzeuge Dr. Kress KG (DE)

( * ) Notice: Subject to any disclaimer, the term of this patent is extended or adjusted under 35 U.S.C. 154(b) by 974 days.

(21) Appl. No.: 12/673,807

(22) PCT Filed: Aug. 21, 2008

(86) PCT No.: PCT/EP2008/006898
§ 371 (c)(1),
(2), (4) Date: Feb. 17, 2010

(87) PCT Pub. No.: WO2009/027055
PCT Pub. Date: Mar. 5, 2009

(65) Prior Publication Data
US 2011/0103909 A1 May 5, 2011

(30) Foreign Application Priority Data

Aug. 25, 2007 (DE) .......................... 10 2007 040 178

(51) Int. Cl.
*B23B 51/02* (2006.01)
(52) U.S. Cl.
USPC ........................................................ 408/230
(58) Field of Classification Search
USPC ........................................ 408/227, 229, 230
IPC ...................................................... B23B 51/02
See application file for complete search history.

(56) References Cited

U.S. PATENT DOCUMENTS

| 2,613,710 | A | | 8/1951 | Emmons |
| 2,936,658 | A | * | 5/1960 | Riley ............................ 408/230 |
| 6,126,367 | A | * | 10/2000 | Reed ............................. 408/1 R |
| 6,626,614 | B2 | * | 9/2003 | Nakamura ....................... 408/59 |
| 6,739,809 | B2 | * | 5/2004 | Shaffer ......................... 408/230 |
| 8,043,035 | B2 | * | 10/2011 | Åstrand et al. ................ 408/144 |
| 8,257,000 | B2 | * | 9/2012 | Onose et al. ..................... 408/59 |
| 2003/0129031 | A1 | * | 7/2003 | Mast et al. ..................... 408/144 |
| 2006/0039767 | A1 | * | 2/2006 | Yamamoto et al. ........... 408/230 |
| 2007/0160437 | A1 | | 7/2007 | Shultz et al. |
| 2008/0181741 | A1 | * | 7/2008 | Borschert et al. ............. 408/230 |

(Continued)

FOREIGN PATENT DOCUMENTS

DE 83 28 538 12/1983
DE 196 02 566 A1 7/1997

(Continued)

OTHER PUBLICATIONS

International Search Report dated Dec. 10, 2008, issued in corresponding international application No. PCT/EP2008/006898.

(Continued)

Primary Examiner — Eric A Gates
(74) Attorney, Agent, or Firm — Ostrolenk Faber LLP

(57) ABSTRACT

A drill having end-face major surfaces, contiguous faces descending from the major cutting edges and flanks contiguous to the major cutting edges. Center cutting edges are formed by end-face taperings. A chisel cutting edge is between the center cutting edges. Shapes of the cutting edges are disclosed. First ones of the flanks are angled to create an outward apex angle so that the major cutting edges and the center cutting edges run at a constant taper angle.

18 Claims, 4 Drawing Sheets

(56) References Cited

U.S. PATENT DOCUMENTS

| | | | |
|---|---|---|---|
| 2008/0193238 A1* | 8/2008 | Hecht | 408/230 |
| 2010/0028098 A1* | 2/2010 | Shaffer | 408/230 |
| 2011/0081215 A1* | 4/2011 | Nakamura et al. | 408/230 |

FOREIGN PATENT DOCUMENTS

| | | | |
|---|---|---|---|
| DE | 203 12 819 U1 | 10/2003 | |
| DE | 698 05 705 T2 | 5/2004 | |
| EP | 0 890 404 B1 | 6/2002 | |
| GB | 2 417 447 A | 3/2006 | |
| JP | 60056809 A * | 4/1985 | B23B 51/02 |
| JP | 63318208 A * | 12/1988 | B23B 51/02 |
| JP | 01-140908 A | 6/1989 | |

OTHER PUBLICATIONS

German Office Action, dated Jul. 20, 2010, issued in corresponding German Patent Application No. 10 2007 040 178.9-14, total 3 pages.
English translation of statement of relevance for DE 83 28 538, total 2 pages.

* cited by examiner

DRILL

CROSS REFERENCE TO RELATED APPLICATION

The present application is a 35 U.S.C. §§371 national phase conversion of PCT/EP2008/006898, filed Aug. 21, 2008, which claims priority of German Application No. 10 2007 040 178.9, filed Aug. 25, 2007, the disclosure of which is incorporated by reference herein. The PCT International Application was published in the German language.

BACKGROUND OF THE INVENTION

The invention relates to a drill.

Drills of the type referred to here are known. They have on their end face at least two major cutting edges which merge into minor cutting edges provided on the circumferential region of the drills. The major cutting edges are formed by faces and flanks contiguous to one another, the faces descending in the direction of rotation of the drill and the flanks descending in the opposite direction. As a rule, the drill is set in rotation and is brought into engagement with a workpiece. It is also conceivable, however, to set the workpiece in rotation and hold the drill fixedly in terms of rotation. In this case, the faces point in the opposite direction to that in which the workpiece rotates. The chips removed by the at least one major cutting edge run off on the faces. In the region of the mid-axis of the drill, a chisel cutting edge is obtained, to which the two end-face major cutting edges are contiguous. Drills of the type referred to here are usually manufactured with a relative core diameter of 10% to 35% of the drilling diameter. In the case of a core diameter greater than 20%, it is necessary to shorten the chisel cutting edge, which connects the two major cutting edges, by means by what is known as tapering out. As a result of this tapering out, center cutting edges are formed which usually form an obtuse angle with the major cutting edge. The smaller this angle is, the shorter these center cutting edges are and, as a rule, the greater the cutting efficiency which these have. The result of the tapering out is that the faces assigned to the major cutting edges form an obtuse angle with the faces assigned to the center cutting edges. In conventional ground sections of drills with a continuous flank, a greater apex angle necessarily arises in the region of the center cutting edge than in the region of the major cutting edge. It became apparent that, in such a configuration of the drill, chips removed by the cutting edges may be compacted and may not flow off freely. The drilling performance is thereby reduced. Damage to the drill may also occur.

SUMMARY OF THE INVENTION

The object of the invention, therefore, is to provide a drill which avoids the disadvantages mentioned here.

To achieve this object, a drill is proposed which has the features mentioned below. This drill comprises at least two end-face major cutting edges with outer minor cutting edges which adjoin these and which are arranged in the region of the circumferential surface of the drill. Both faces and first flanks which are inclined in the opposite direction are contiguous to the major cutting edge. The faces are inclined in the direction of rotation of the drill and the first flanks in the opposite direction. The at least two major cutting edges of the drill are formed by the line of intersection of the faces with the first flanks. Moreover, at least two center cutting edges with faces which form an obtuse angle with the faces of the major cutting edges are provided. The drill is distinguished in that the first flanks also have segments which are arranged at an obtuse angle to one another, the number of segments of the first flanks corresponding to the number of segments of the faces. The at least two center cutting edges and major cutting edges descend, as seen from the chisel cutting edge, at a constant apex angle a outward in the direction of the circumferential surface of the drill, that is to say in the direction of the minor cutting edges.

A preferred exemplary embodiment of the drill is distinguished in that the inner faces of the center cutting edges are inclined to a lesser extent than the further-out faces of the major cutting edge. The latter runs in a plane in which the mid-axis or axis of rotation of the drill also lies. The inner face preferably forms an acute angle with a plane on which the mid-axis stands perpendicularly.

In a preferred exemplary embodiment of the drill, there is provision for the inner face of the center cutting edge to merge into the outer face of the major cutting edge via a bend or via an arc. The chip run-off can thereby be influenced in a wide range.

In a further preferred exemplary embodiment, there is provision for the inner segment of the first flank to be inclined to a greater extent than the outer segment, that is to say, starting from the mid-axis of the drill, the inner first segment of the flank descends in the direction of the circumferential surface of the drill to a greater extent than the outer flank segment reaching up to the circumferential surface of the drill.

A particularly preferred exemplary embodiment of the drill is distinguished in that the clearance angle of the first flanks becomes smaller outward, as seen from the center of the drill, that is to say from the mid-axis. The clearance angle preferably decreases continuously.

In a further preferred exemplary embodiment of the drill, there is provision for the at least first flank, which is contiguous to the major cutting edge, to have adjoining it a second flank. This is inclined to a greater extent than the first flank, that is to say its clearance angle is greater than that of the first flank.

An exemplary embodiment of the drill is particularly preferred in which the second flank has, in a similar way to the first flank, segments which are inclined differently, as seen in the radial direction of the drill, correspondingly to the segments of the first flank and which merge into one another via a bend or an arc.

BRIEF DESCRIPTION OF THE DRAWINGS

The invention is explained in more detail below by reference to the drawings in which:

FIG. 3a shows a first side view of the drill illustrated in FIG. 3;

FIG. 3b shows a second view of the drill illustrated in FIG. 3;

FIG. 4a shows a first side view of the drill illustrated in FIG. 4;

FIG. 4b shows a second side view of the drill illustrated in FIG. 4, and

DESCRIPTION OF PREFERRED EMBODIMENTS

Figure 1:
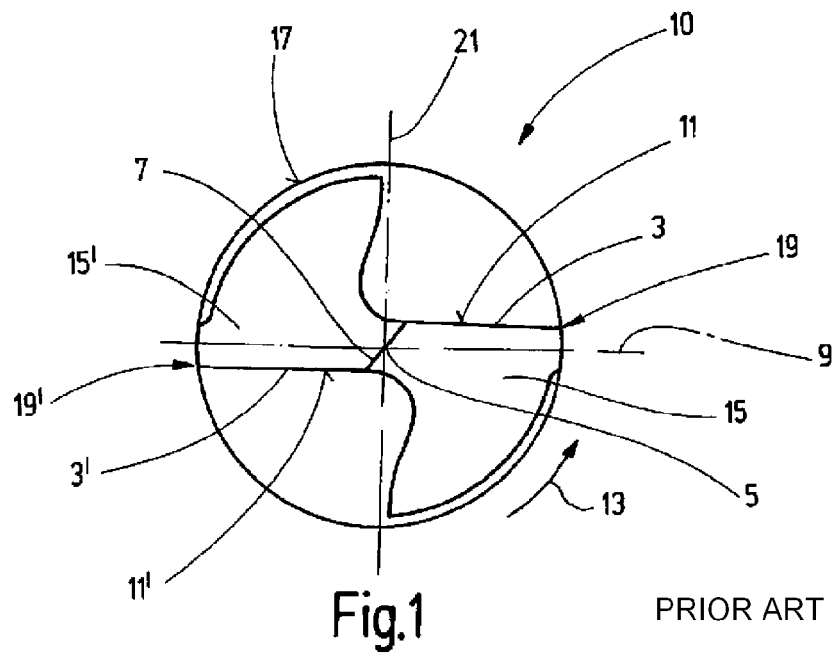
FIG. 1 shows an end view of a drill with a conventional ground section without tapering out.

A known drill 10, illustrated in an end view in FIG. 1, has a first major cutting edge 3 and a second major cutting edge 3' arranged point-symmetrically with respect to the mid-axis 5 of the drill. The two major cutting edges 3, 3' are connected to one another by means of a chisel cutting edge running through the mid-axis 5. The two major cutting edges 3, 3' are arranged parallel to a diametral line 9 which in FIG. 1 runs horizontally through the mid-axis 5. The first major cutting edge 3 is assigned a face 11 running perpendicularly with respect to the image plane of FIG. 1, and the second major cutting edge 3' is assigned a corresponding face 11'.

The faces 11, 11' are inclined in the direction of rotation of the drill, indicated by an arrow 13. The major cutting edges 3, 3' have adjoining them respective flanks 15, 15' which descend in the opposite direction and are consequently inclined opposite to the direction of rotation indicated by the arrow 13.

The major cutting edges 3, 3' merge into minor cutting edges 19, 19' which are arranged in the region of the circumferential surface 17 of the drill and which in FIG. 1 run perpendicularly with respect to the image plane. The minor cutting edges may be oriented parallel to the mid-axis 5 of the drill or else may run along an imaginary helix.

FIG. 1 shows that the chisel cutting edge 7 forms an acute angle with a diametral line 21 running perpendicularly with respect to the diametral line 9. In the region of this chisel cutting edge 7, the cutting properties of the drill are poor, and therefore this chisel cutting edge should be as short as possible. This is achieved by means of a tapering out which is evident from FIG. 2.

Figure 2:
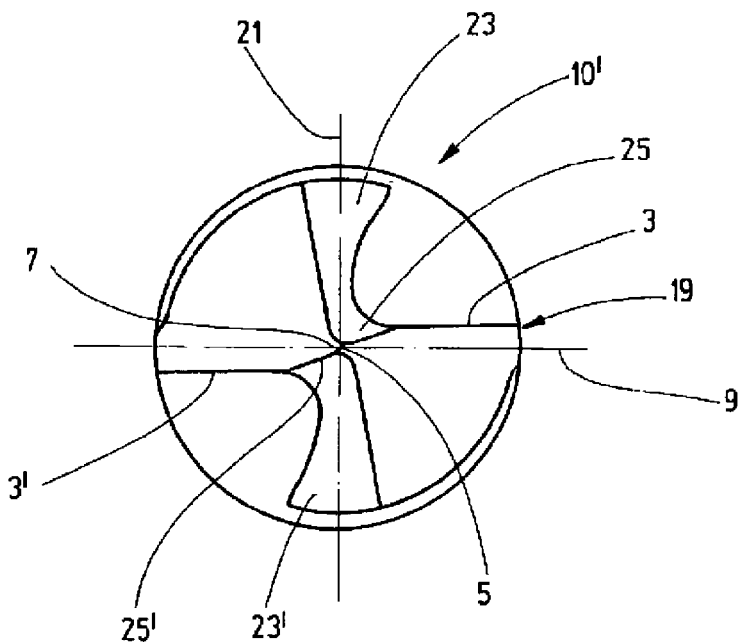
FIG. 2 shows an end view of a drill with a conventional ground section and with tapering out.

FIG. 2 shows a known drill 10' in an end face view. Identical and functionally identical parts are given the same reference numerals, and therefore, to that extent, reference is made to the description relating to FIG. 1.

The drill 10' illustrated in FIG. 2 is constructed basically in the same way as that explained with reference to FIG. 1. It differs solely in that, in its end face, flattenings 23, 23' are introduced, which extend near to the mid-axis 5 of the drill and which include parts of the major cutting edge 3, 3' and, in particular, of the chisel cutting edge 7. The main cutting edge 3 no longer runs continuously in a straight line from the minor cutting edge 19 as far as the chisel cutting edge 7. It descends, at a distance from the diametral line 21, at an acute angle to the diametral line 9. The same applies to the second major cutting edge 3'.

The flattenings 23, 23' result, therefore, in cutting edge regions of the major cutting edges, which cutting edge regions descend with respect to the diametral line 9 and are also designated as center cutting edges which run at an obtuse angle with respect to the major cutting edges 3, 3'. The smaller this angle is, the shorter these center cutting edges are, and, as a rule, the higher the cutting efficiency of these is. On the other hand, however, due to a tapering out of this kind, afforded by the flattening 23, 23', an increase in the apex angle of the center cutting edges, as compared with the apex angle of the major cutting edges, is obtained. The increase in the apex angle in the center region has a highly adverse influence on the centering behavior of the drill, particularly during the spot-drilling phase, and this may cause the drill to run off-center. If a drill runs off-center as early as during spot-drilling, it can no longer be stabilized even during the subsequent full-drilling process, because its guide chamfers hold it in this position offset with respect to the axis of rotation. As a result, very high normal forces act upon the guide chamfers of the drill and also upon the cutting edge corners lying between the major and the minor cutting edges, thus greatly reducing the service life of the drill.

Moreover, a compaction of the chips removed from a workpiece occurs at the bending point of the major cutting edge 3, 3', and therefore these chips cannot flow off freely.

Figure 3:
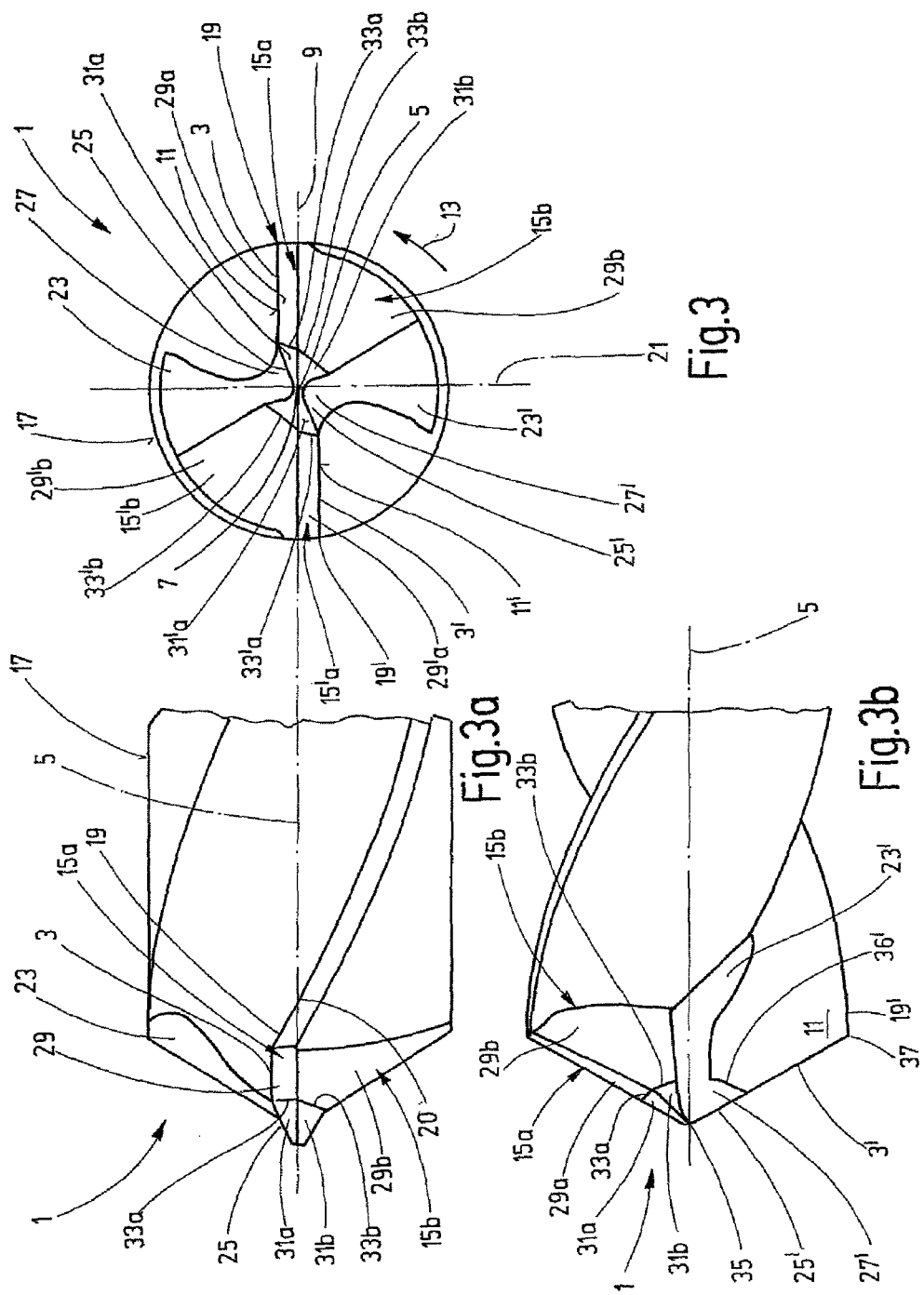
FIG. 3 shows a drill with a ground section according to the invention both in an end view and in a side view.

FIG. 3 shows an end view of a drill 1 according to the invention. The front end of the drill 1 is illustrated in a side view in FIG. 3a. In terms of the end view, FIG. 3a is a view from the right.

FIG. 3b illustrates the front side of the drill 1 in a side view which, in terms of the end view according to FIG. 3, reproduces a view from below. Identical and functionally identical parts are given the same reference numerals, and therefore, to that extent, reference is made to the description relating to FIGS. 1 and 2.

The drill 1 accordingly has a first major cutting edge 3 and a second major cutting edge 3' which are arranged point-symmetrically to one another with respect to the mid-axis 5 of the drill. As seen in the direction of rotation illustrated by the arrow 13, the major cutting edges 3 and 3' have adjoining them the first and the second face 11, 11'. These are inclined in the direction of rotation. The drill illustrated in FIG. 3 also has first flanks 15a, 15'a which adjoin the major cutting edges 3 and 3' and which, starting from the first major cutting edge 3, 3', descend opposite to the direction of rotation.

As in the known drill 10' according to FIG. 2, in the drill 1 flattenings 23, 23', also designated as a tapering out, are provided, which reach near to the mid-axis 5 and therefore greatly shorten the chisel cutting edge 7, as compared with the known drill according to FIG. 1. They also have the result that, starting from the minor cutting edge 19, the first major cutting edge 3 first runs parallel to the diametral line 9 and then continues at an acute angle to this diametral line 9. Here, too, therefore, a center cutting edge 25 is obtained. The same applies correspondingly to the second major cutting edge 3' in which a center cutting edge 25' is formed by means of the flattening 23'.

The faces 11, 11' assigned to the first major cutting edge 3, 3' run perpendicularly with respect to the image plane of FIG. 3, while the faces assigned to the inner part of the major cutting edges, that is to say the faces 27, 27' assigned to the center cutting edges 25, 25', likewise descend in the direction of the direction of rotation indicated by the arrow 13, but at a substantially flatter angle. The two segments of the face form an obtuse angle.

It is clear from FIG. 3 that the first flanks 15a, 15'a have two segments 29a and 31a which are inclined at an obtuse angle to one another. The first segment 29a adjoining the circumferential surface 17 extends over that region of the first major cutting edge 3 which runs essentially parallel to the diametral line 9. The second segment 31a of the first flank 15a adjoins the first segment 29a inward and extends over the second part of the first major cutting edge, to be precise over the region of the center cutting edge 25. The two segments 29a and 31a form an obtuse angle, the inner second segment 31a descending, as seen from the mid-axis 5, more steeply outward to the circumferential surface than the outer first segment 29a. The two segments 29a and 31a are separated from one another by a bending line 33a. As regards the second major cutting edge 3', the same conditions arise. Reference is therefore made to the explanations relating to the first major cutting edge 3.

The diametral line 9 separates the first flanks 15a, 15'a from second flanks 15b, 15'b which are inclined to a greater extent than the first flanks 15a, 15'a with respect to an imaginary plane on which the mid-axis 15 stands perpendicularly and which coincides with the image plane of FIG. 3. The clearance angle is therefore greater here than in the region of the first flanks.

The second flanks 15b, 15'b are designed correspondingly to the first flanks 15a, 15'a: the second flanks 15b, 15'b have in each case a first segment 29b and 29'b and also 31b, and 31'b. Correspondingly to the first and second segments 29a, 31a, 29'a, 31'a, the second segments 29b, 29'b and 31b, 31'b are also inclined at an obtuse angle to one another, the segments 29b, 29'b which adjoin the mid-axis 5 descending in the direction of the circumferential surface of the drill 1 at a steeper angle than the further-out second segments 31b and 31'b.

The two segments 29b, 29'b and 31b, 31'b merge into one another via a bending line 33b.

If the drill 1 reproduced in FIG. 3 is viewed from the right, the side view, reproduced in FIG. 3a, of the drill 1 is obtained. Identical parts are given the same reference numerals, and therefore, to that extent, reference is made to the description relating to FIG. 3.

It is shown that the first major cutting edge 3 is arranged essentially parallel to the diametral line 9 running perpendicularly with respect to the image plane in FIG. 3a and also parallel to a plane which runs at a distance from the mid-axis 5. The first flank 15a with the first segment 29a and with the second segment 31a lies below the first major cutting edge 3. These two segments merge into one another the bending line 33a. The second flank 15b with the first segment 29b and with the second segment 31b can also be seen. These two segments merge into one another via the bending line 33b. It is shown clearly that, with respect to a plane on which the mid-axis 5 stands perpendicularly, the second segment 31b descends more steeply outward to the circumferential surface 17 than the first segment 29b.

FIG. 3a also shows the flattening 23, and also the minor cutting edge 19 which here runs along an imaginary helix, that is to say not parallel to the mid-axis 5. The minor cutting edge 19 lags behind a guide chamfer 20 during the machining of a workpiece.

If the drill 1 illustrated in an end face view in FIG. 3 is viewed from below, the side view reproduced in FIG. 3 is obtained, only the front part of the drill 1 being reproduced here. Identical parts have the same reference numerals, and therefore reference is made to the explanations relating to FIGS. 3 and 3a.

The center cutting edge 25' which adjoins the tip 35 of the drill 1 and is part of the major cutting edge of the drill 1 can be seen below the center line 5 in FIG. 3b. The associated face 27' confronts the viewer. It is part of the flattening 23', which constitutes the tapering out of the drill 1, and merges into the face 11' via a bending line 36'. However, an arcuate transition is particularly preferred.

The second major cutting edge 3' with the associated face 11' adjoins the center cutting edge 25'. The second major cutting edge 3' merges into the minor cutting edge 19'. An edge 37 can be seen here between the second major cutting edge 3' and the minor cutting edge 19'. There may, however, also be provision for the major cutting edges to merge into the minor cutting edges via a radius.

What has been said with regard to the second minor cutting edge 3' and to the center cutting edge 25' applies correspondingly to the point-symmetrically arranged first major cutting edge 3 and center cutting edge 25.

The first flank 15a and the second flank 15b, with the associated segments 29a, 31a and 29b, 31b, can be seen above the mid-axis 5. The bending line 33a of the first flank 15a and the bending line 33b of the second flank 15b can also be seen.

FIG. 3b shows very clearly that, starting from the tip 35 of the drill 1, the center cutting edge 25' and the second major cutting edge 3' merge into one another and have the same constant angle of inclination, also designated as an apex angle, with respect to the center line 5.

Figure 4:
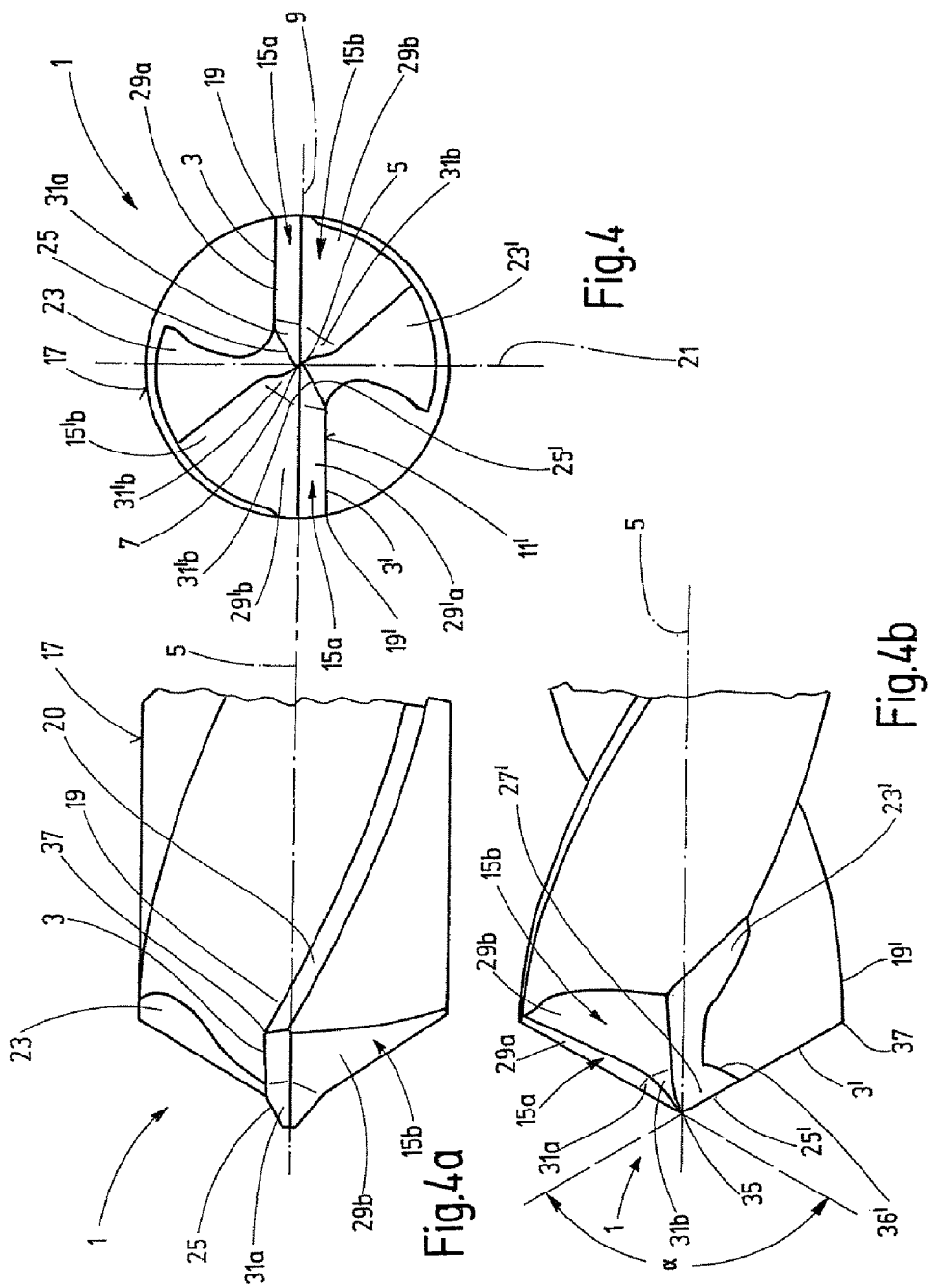
FIG. 4 shows a different exemplary embodiment of a drill with an arcuate cutting edge in an end view and a side view.

FIG. 4 shows an end view of a modified exemplary embodiment of the drill 1 illustrated in FIG. 3. Identical parts are given the same reference numerals, and therefore, to that extent, reference is made to the description relating to the preceding Figures.

The drill 1 reproduced in FIG. 4 differs from that illustrated in FIG. 3 only in that the segments 29a, 31a of the first flank 15a do not merge into one another via a bending line, but, instead, arcuately. There is therefore no sharply defined step between the two segments.

The same applies correspondingly to the segments 29'a, 31'a of the first flank 15'a which lies opposite the first flank 15a point-symmetrically with respect to the mid-axis 5.

The same also applies to the second flanks 15b and 15'b: the first segments 29b and 29'b merge arcuately into the second segments 31b and 31'b, so that, here too, there is no bend formed, but, instead, a smooth transition.

If the drill 1 illustrated in an end view in FIG. 4 is viewed from the right, the side view illustrated in FIG. 4a is obtained. Everything said with regard to FIG. 3a applies correspondingly to this illustration.

In a bottom view of the drill 1 reproduced in an end view in FIG. 4, the side view, illustrated in FIG. 4, of the drill 1 is obtained. Everything said with regard to FIG. 3b applies correspondingly to the illustration according to FIG. 4b.

It is also clear from the illustrations according to FIGS. 4a and 4b that no bending lines are provided here, and that the segments of the flanks merge arcuately into one another.

The bending lines 33a and 33b mentioned in FIGS. 3, 3a and 3b are therefore absent in the drill illustrated in FIGS. 4, 4a and 4b and are replaced by an arcuate transition of the flanks.

FIG. 4b depicts the apex angle α which is formed by the major cutting edges 3, 3' and the center cutting edges 25, 25' and which is not illustrated in FIG. 3b for the sake of clarity.

Figure 5:
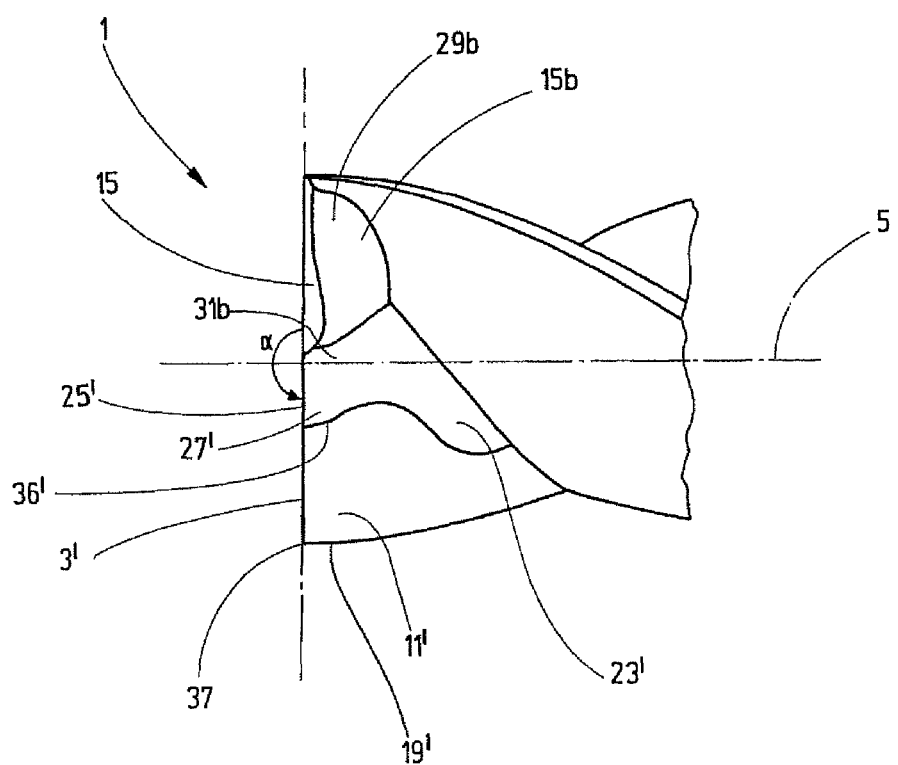
FIG. 5 shows a further modified exemplary embodiment of a drill according to the invention with an acute angle of 180°.

FIG. 5 shows a side view of a further exemplary embodiment of a drill 1. This view corresponds to the side views according to FIGS. 3b and 4b. Identical and functionally identical parts are given the same reference numerals, and therefore reference is made to the description relating to the preceding Figures. In the particularly preferred exemplary embodiment of the drill, as illustrated in FIG. 5, there is provision for the apex angle α to amount to 180°, that is to say that the two end-face major cutting edges 3 and 3' and the center cutting edges 25, 25' of the drill lie in a plane on which the mid-axis 5 stands perpendicularly. In this drill, contrary to known drills, a face correction is not necessary because, as is evident from FIGS. 3 and 4, the major cutting edges lie approximately 5% to 15% in front of the middle, that is to say arranged in front of the diametral line 9, as seen in the direction of rotation indicated by the arrow 13. In this case, the first flanks 15a and 15'a are configured so that an absolutely planar drillhole bottom is obtained even when the major cutting edge is curved, that is to say lies in front of the middle in the region of the center cutting edges 25, 25'.

It was stated above with reference to FIGS. 3, 3a, 3b and 4, 4a and 4b that the first and second segments 29a, 29'a, 29b, 29'b and 31a, 31'a, 31b and 31'b merge into one another via a bending line or an arcuate region. In addition, there is preferably provision for the clearance angle of the flanks to decrease, starting from the center, that is to say starting from the mid-axis 5, toward the circumferential surface 17. By virtue of this configuration, the cutting edge corners which are subjected to a particularly high load can be designed with higher stability. At the same time, so much latitude is afforded at the center of the drill that even very high feed motions are possible with this type of drill.

A further relieving of the cutting edge corners may be achieved in that the edge 17 is avoided in the transitional region between the major cutting edges and minor cutting edges and a radius is formed.

FIG. 5 therefore shows a drill in which the apex angle α amounts to 180°. A top view of the end face of a drill of this type corresponds to the top view reproduced in FIG. 3. To that extent, reference is made particularly to this illustration.

In FIG. 5, the first flank 15a and the second flank 15b can be seen above the center line 5, and also the first segment 29b and the second segment 31b of this second flank 15b. The second major cutting edge 3' and its segment and the center cutting edge 25' can be seen below the center line 5. The face 11' assigned to the second major cutting edge 3' and the face 27' assigned to the center cutting edge 25' can also be seen. These faces are separated by a bending line 36' or merge into one another via an arc.

In this illustration, too, as in FIGS. 3b and 4b, it becomes clear that the second major cutting edge 3' and its associated cutting edge segment, to be precise the center cutting edge 25', are inclined, starting from the center line 5, at the same, preferably continuous, apex angle, a continuous transition being present between the center cutting edge 25' and the second segment 3'. In FIG. 5, the center cutting edge 25' and the second major cutting edge 3' are arranged at an angle of 90° to the mid-axis 5. The same applies correspondingly to the point-symmetrical first major cutting edge with the associated cutting edge segment, the center cutting edge 25. The apex angle α of 180° is consequently obtained.

When the drill 1 illustrated in FIG. 5 is used, a completely planar drillhole bottom is obtained. On account of the special configuration of the tapering out, which is implemented by the flattening 23' and the flattening 23, not evident here, a compaction of the chips removed the center cutting edges 25 and 25' is reliably avoided. These can flow off freely via the face 27, 27'.

It is therefore shown that a drill which avoids the disadvantages known in the prior art is provided in a simple way. The exemplary embodiments according to FIGS. 3 and 4 ensure that the drill is centered very accurately especially in the spot-drilling phase. This is achieved by means of the tapering out, that is to say by the faces 23 and 23' which lead to an increase in the apex angle in the center region, as will be evident from FIGS. 3a and 3b. At the same time, a compaction of the chips removed here is avoided.

The avoidance of chip compaction is also obtained in the exemplary embodiment of the drill 1, as illustrated in FIG. 5.

A summary of the elements of all the embodiments follows.

This disclosure concerns a drill with at least two end-face major cutting edges 3, 3', with faces 11, 11' contiguous to these cutting edges and the faces descending in a first direction. First flanks 15a, 15'a are contiguous to the at least two major cutting edges 3, 3' and descend in the opposite direction to the faces 11, 11'. At least two end-face taperings out, by means of each of which is formed a center cutting edge 25, 25' which is contiguous to the major cutting edges 3, 3' and faces 27, 27' descend in the first direction are contiguous to the major cutting edges. A chisel cutting edge 7 runs between the at least two center cutting edges 25, 25'. Minor cutting edges 19, 19' are provided in the region of a circumferential surface 17 of the drill 1. Each major cutting edge 3, 3' is associated with a minor cutting edge 19, 19'. The at least two major cutting edges 3, 3' are formed by the line of intersection of the faces 11, 11' with the first flanks 15a, 15'a. The faces 11, 11' of the major cutting edges 3, 3' and the faces 27, 27' of the center cutting edges 25, 25' are arranged at an obtuse angle to one another. This drill is distinguished in that the first flanks 15a, 15'a have segments 29a, 29'a; 31a, 31'a which are arranged at an obtuse angle to one another. The segments of the first flanks 15a, 15'a are associated with the face 27, 27' of the center cutting edge 25, 25' and to the face 11, 11' of the major cutting edge 3, 3'. The major cutting edges 3, 3' have adjoining them center cutting edges 25, 25'. The first flanks 15a, 15'a are angled opposite to the faces 11, 27 so that the major cutting edges 3, 3' and center cutting edges 25, 25' run at a constant apex angle α outward in the direction of a circumferential surface 17 of the drill 1.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

The invention claimed is:

1. A drill, comprising:
   a drill end face;
   at least two end-face major cutting edges on the end face;
   first faces contiguous to the major cutting edges and the first faces descending in a first direction;
   first flanks contiguous respectively to the at least two major cutting edges and the first flanks descending in a second opposite direction with respect to the first faces;
   at least two end-face taperings out, each forming a center cutting edge which is contiguous to the major cutting edges;
   second faces descending in the first direction and contiguous to the at least two end-face taperings out;
   a chisel cutting edge running between the at least two center cutting edges;
   minor cutting edges provided in a region of a circumferential surface of the drill, each major cutting edge being associated with a respective minor cutting edge;
   the at least two major cutting edges being formed by a line of intersection of the first faces with the first flanks;
   the first faces of the major cutting edges and the second faces of the center cutting edges being arranged at an obtuse angle to one another;
   the first flanks having respective segments, and the segments are arranged at an obtuse angle to one another;
   the segments of the first flanks being associated with the second faces of the center cutting edge and to the first faces of the major cutting edge;
   the center cutting edges adjoining the major cutting edges; and
   the first flanks being angled opposite to the first and second faces so that the major cutting edges and the center cutting edges run at a constant apex angle α outward in the direction of a circumferential surface of the drill.

2. The drill as claimed in claim 1, wherein the apex angle α is an obtuse angle.

3. The drill as claimed in claim 1, wherein the apex angle α is $0° \leq \alpha \leq 180°$.

4. The drill as claimed in claim 1, wherein the second faces are inner of the center cutting edges are inclined to a lesser extent than further-out first faces of the major cutting edge.

5. The drill as claimed in claim 1, wherein the second faces are inner faces of the center cutting edge and merge into the first faces which are outer face of the major cutting edge and the merge is via a bend at a bending line or via an arc.

6. The drill as claimed in claim 1, wherein each first flank has an inner segment and each major cutting edge has an outer segment, and
  wherein the inner segment of the first flank has a greater clearance angle than the outer segment of an associated one of the major cutting edges.

7. The drill as claimed in claim 6, wherein the inner segment of the first flank merges into the outer segment via a bend at a bending line or via an arc.

8. The drill as claimed in claim 1, wherein a clearance angle of the first flanks decreases outward from a center line of the drill.

9. The drill as claimed in claim 8, wherein the clearance angle decreases continuously.

10. The drill as claimed in claim 1, further comprising second flanks which are contiguous to the at least two first flanks and are inclined to a greater extent than the first flanks.

11. The drill as claimed in claim 10, wherein each second flank comprises segments and a number of the segments corresponds to a number of segments of the first flanks and which are arranged at an obtuse angle to one another.

12. The drill as claimed in claim 10, wherein the inner segment of the second flanks is inclined to a greater extent than the outer segment.

13. The drill as claimed in one claim 10, wherein the inner segment of the second flank merges into the outer segment thereof via a bend at a bending line or via an arc.

14. The drill as claimed in claim 10, wherein the clearance angle of the second flanks decreases outward from a center line of the drill.

15. The drill as claimed in claim 14, wherein the clearance angle decreases continuously.

16. The drill as claimed in claim 1, wherein the major cutting edges merge into the minor cutting edges via a radius.

17. The drill as claimed in claim 1, having an apex angle $\alpha$ of 180°.

18. The drill as claimed in claim 1, wherein the apex angle $\alpha$ is $120° \leq \alpha \leq 180°$.

* * * * *

UNITED STATES PATENT AND TRADEMARK OFFICE
CERTIFICATE OF CORRECTION

PATENT NO.       : 8,628,278 B2                                              Page 1 of 1
APPLICATION NO. : 12/673807
DATED            : January 14, 2014
INVENTOR(S)      : Ulrich Krenzer It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 975 days.

Signed and Sealed this
Twenty-second Day of September, 2015

Michelle K. Lee
*Director of the United States Patent and Trademark Office*